United States Patent
Berman

(10) Patent No.: US 6,460,415 B1
(45) Date of Patent: *Oct. 8, 2002

(54) VIBRATORY SYSTEM UTILIZING SHOCK WAVE VIBRATORY FORCE

(76) Inventor: Stephen B. Berman, 1601 Lipan Trail, Austin, TX (US) 78733-1510

( * ) Notice: Subject to any disclaimer, the term of this patent is extended or adjusted under 35 U.S.C. 154(b) by 0 days.

This patent is subject to a terminal disclaimer.

(21) Appl. No.: 09/508,128
(22) PCT Filed: Sep. 8, 1997
(86) PCT No.: PCT/US97/15313
§ 371 (c)(1), (2), (4) Date: Mar. 7, 2000
(87) PCT Pub. No.: WO99/13454
PCT Pub. Date: Mar. 18, 1999

Related U.S. Application Data

(63) Continuation-in-part of application No. 08/557,942, filed on Nov. 14, 1995, now Pat. No. 5,665,917.

(51) Int. Cl.$^7$ ................................................. G01M 7/02
(52) U.S. Cl. ........................................................ 73/662
(58) Field of Search ........................... 73/590, 592, 52, 73/54, 28, 54.41, 61.75, 61.49, 586, DIG. 1

(56) References Cited

U.S. PATENT DOCUMENTS

| | | | |
|---|---|---|---|
| 3,492,688 A | | 2/1970 | Godfrey ................... 17/25 |
| 3,608,715 A | | 9/1971 | Snyder ................... 209/111.9 |
| 3,688,562 A | * | 9/1972 | Munger et al. ............. 73/67.7 |
| 4,333,796 A | | 6/1982 | Flynn ....................... 376/100 |
| 4,736,130 A | | 4/1988 | Puskas ..................... 310/316 |
| 4,991,151 A | | 2/1991 | Dory ........................ 367/150 |
| 5,074,150 A | | 12/1991 | Tirelli et al. ............. 73/590 |
| 5,257,545 A | | 11/1993 | Au-Yang ................... 73/597 |
| 5,665,917 A | * | 9/1997 | Berman ..................... 73/662 |

FOREIGN PATENT DOCUMENTS

| | | |
|---|---|---|
| AN | 86-026955 | 7/1985 |
| DE | 3404492 A | 8/1984 |
| DK | 3621921 A | 1/1988 |
| FR | 2191565 A | 1/1974 |
| SU | 1165986 A | 7/1985 |

OTHER PUBLICATIONS

Robert A. Hiller and Bradley P. Barber, "Producing Light from a Bubble of Air," Scientific American, Feb. 1995, pp. 96–98.

Seth J. Putterman, Sonoluminescence: Sound into Light, Scientific American, Feb. 1995, pp. 46–51.

Joecelyn Kaiser, "Inferno in a Bubble," Science News, vol. 147, Apr. 25, 1995, pp. 266–267.

Charles C. Church, "A Theoretical Study of Cavitation Generated by an Extracorporeal Shock Wave Lithtripter," Journal Accoustical Society of America, vol. 86, Jul. 1, 1989, p. 215.

Ivars Peterson, "Sonic Impact, Lowering the Boom of Supersonic Flight," Science News, vol. 148, Sep. 23, 1995, pp. 206–207.

W. Wayt Gibbs, "Ultrasound's New Phase," Scientific American, Jun. 1996, pp. 32 and 34.

Lord Rayleigh (John Williams Strutt), Scientific Papers, Dover Publications, Inc., New York, 1964, 15 pages (no page numbers).

"Why Fiery Bubbles Live in a Waterworld," Science News, vol. 148, Aug. 19, 1995, p. 127.

(List continued on next page.)

Primary Examiner—Helen Kwok

(57) ABSTRACT

A method of constructing vibrator devices particularly adapted for producing and applying vibratory forces to bodies or test bodies for any measuring or an testing purposed by using cavitating spaces within fluids within housings which are driven by piezoelectric drivers to thereby produce supersonic shock-wave vibratory forces which are coupled by any gas interfaces or any liquid interfaces or any solid interfaces to bodies or test bodies is presently disclosed.

25 Claims, 10 Drawing Sheets

OTHER PUBLICATIONS

Harold E. Edgerton and Gary G. Hayward, "The 'Boomer' Sonar Source for Seismic Profiling," Journal of Geophysical Research, vol. 69, No. 14 pp. 3,033–3,042, Jul. 15, 1964.

A. Unsworth, D. Dowson, V. Wright, "'Cracking Joints' A Bioengineering Study of Cavitation in the Metacarpophalangeal Joint," presentation to the Heberden Society, Nov. 1970.

* cited by examiner

VIBRATORY SYSTEM UTILIZING SHOCK WAVE VIBRATORY FORCE

This is U.S. national stage of PCT/US97/15313 filed Sep. 8, 1997 which is a continuation-in-part of application Ser. No. 08/557,942, filed Nov. 14, 1995, now U.S. Pat. No. 5,665,917.

TECHNICAL FIELD

This invention relates to vibrator device systems and more particularly to shock wave vibratory forces produced by, for example, one or more cavitating spaces and applied to one or more bodies for, for example, measuring purposes, testing, or imaging purposes.

BACKGROUND ART

A useful application of vibratory forces involves subjecting one or more bodies to vibratory forces to determine qualities, characteristics, conditions, and for examination, inspection, material characterization, and imaging of internal and external structures. Vibrator devices have been particularly constructed and adapted for producing and applying vibratory forces to one or more bodies including one or more test bodies. Methods and devices have also been developed to temporally control the vibrator devices, to display and record information about the temporal control of the vibrator devices, and to record the temporal control of information. Methods and devices have also been developed for analyzing information about the temporal control of the vibrator devices, for displaying the analyzed temporal control information, and for recording the analyzed information. Methods and devices have also been developed for spatial control of vibrator devices and for displaying and recording spatial control information of vibrator devices. Methods and devices have also been developed for the analysis of the spatial control information, and for the display and recording of analyzed information about the spatial control of vibrator devices. Methods and devices have also been developed for receiving and transducing one or more vibratory forces propagated by any transmission through, reflection from, or refraction by one or more bodies. Methods and devices have also been developed for displaying and recording the received and transduced vibratory forces. Methods and devices have also been developed for analysis of the received and transduced one or more vibratory forces and for display and recording of the one or more analyzed vibratory forces.

Methods and devices particularly adapted for producing and applying vibratory forces to one or more bodies for test purposes or measurement purposes have applied vibratory forces that are not shock waves or produced from shock waves.

Referring to FIG. 1, a cavitating space 102 (not necessarily to scale) may be generated with a vibrator device 101 having liquid water 104 within glass housing 106. The cavitating space 102 may be generated by producing sound waves in the liquid water 104 at approximately 20–25 kHz using polarized piezoelectric transducers 108 and 110 of the vibrator device 1. The cavitating space produces shock waves in liquid water 104. Driving signals for piezoelectric transducers 108 and 110 are generated and monitored by function generator and amplifier 112. Thus, function generator and amplifier 112 provide temporal control of the shock waves produced by the cavitating space 101. Spatial control of the cavitating space 102 is maintained in part by spatial controller 113, which may be a pivotal, mechanical support mechanism. Methods for construction of vibrator devices that produce shock wave vibratory forces by using cavitating spaces within liquid water in glass housings driven by piezoelectric drivers have been described in Scientific American, pages 46–51 and 96–98 of vol. 272, no. 2. February, 1995, and Science News, pages 266–267, vol. 147, no. 17. Apr. 29, 1995.

DISCLOSURE OF INVENTION

In one embodiment, the presently disclosed shock wave vibratory system and method of utilizing vibrator devices that produce shock wave vibratory forces may replace and provide superior, for example, imaging and analysis of bodies relative to vibratory systems that produce and apply non-shock wave vibratory forces.

In one embodiment of the present invention, one or more shock wave vibrations are produced by, for example, one or more cavitating spaces within one or more fluid substances within one or more housings. Vibratory force, that is a shock wave, is transmitted through, reflected from, and/or refracted by bodies or test bodies in a manner generally unlike non-shock wave vibratory force. Shock wave vibratory force is, in general, a limiting form of vibratory force.

In one embodiment of the present invention, one or more shock wave vibrations are produced by, for example, cutting elements severing an object such as wire. A distal end of the severed object is disposed proximate to a body, and the shock wave propagates down the severed object and is transmitted to the body. The vibratory forces produced in the body by the shock wave may be detected and analyzed for, for example, measuring purposes, test purposes, imaging, characterizing, examining, inspecting, or obtaining other information about the body.

In one embodiment of the present invention, a method of constructing vibrator devices particularly adapted for producing and applying shock wave vibratory forces to one or more bodies for measuring purposes or testing purposes is provided.

In one embodiment of the present invention, a method of producing shock wave vibratory forces within a fluid substance confined by a housing for application to one or more bodies for measuring purposes, test purposes, imaging, characterizing, examining, inspecting, or obtaining other information about the one or more bodies. Shock wave vibration is of a duration that allows shock wave vibratory forces to be produced singularly or in trains at any rate up to and including ultrasonic rates.

In one embodiment of the present invention, a method utilizes one or more shock wave vibratory forces produced by one or more cavitating spaces within one or more fluid substances within one or more housings which is therefore an improvement of the art of methods for producing vibrator devices that are particularly adapted for producing and applying non-shock wave vibratory forces for, for example, any testing purposes or any measuring purposes.

BRIEF DESCRIPTION OF DRAWINGS

Reference numerals referring to the same feature appearing in multiple figures are the same.

MODE(S) FOR CARRYING OUT THE INVENTION

Figure 1:
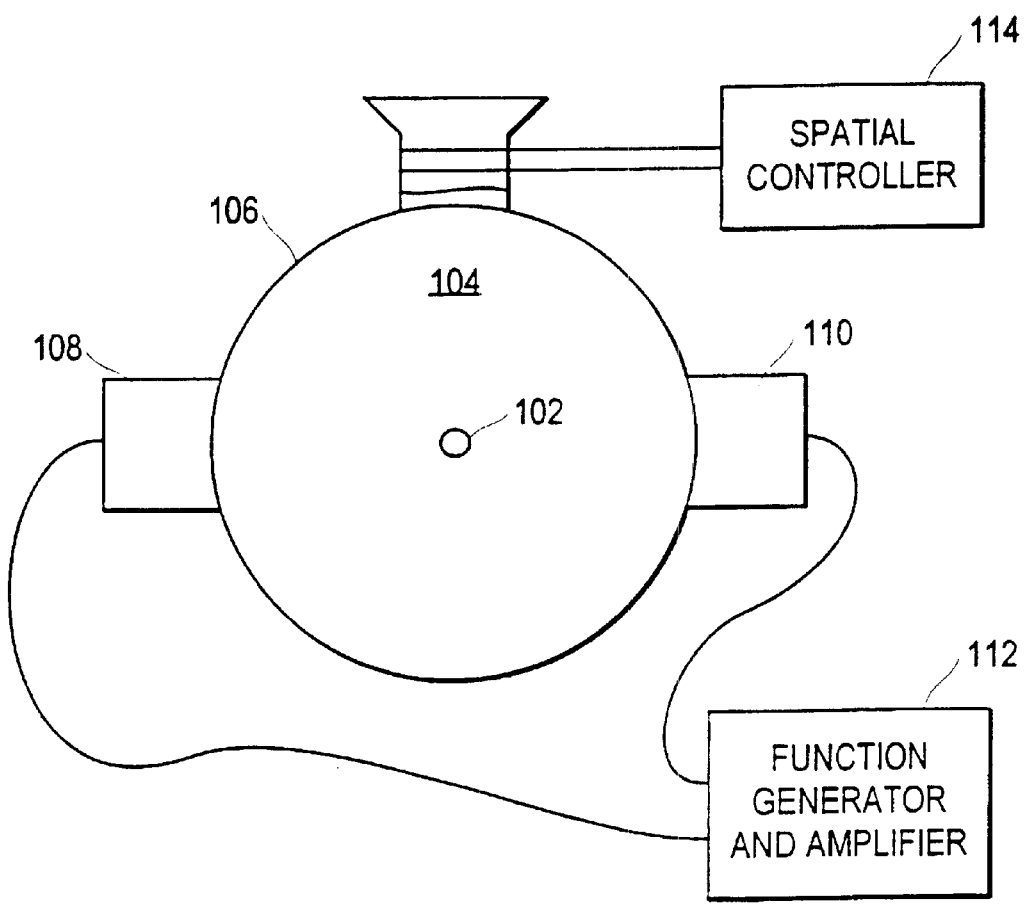
FIG. 1, labeled prior art, is a vibrator apparatus for producing cavitating space within a liquid.

The following description of the invention is intended to be illustrative only and not limiting.

To, for example, image, characterize, examine, inspect or obtain other information about a body, a shock wave vibratory system utilizes shock wave vibratory forces which in one embodiment are generated by cavitating spaces in a fluid substance confined within a housing. In other embodiments, the shock wave vibratory forces are generated by an explosive device within a housing and a cutting device to generate shock wave vibratory forces in a severed object for transmission to a body. The shock wave vibratory forces may be coupled to the body and exhibit superior propagation properties within and through the body and may provide high resolution information. After reception of the vibratory force information and transduction into electrical signals, the information may be, for example, recorded, analyzed, and displayed. The frequency of shock wave vibratory force generation may be controlled using a temporal control device and location of the system and location of the shock wave vibratory system may be controlled with a spatial control device. The frequency of generation is variable and includes subultrasonic and ultrasonic generation frequencies.

Vibrator devices may be constructed by methods and devices using materials known to ones experienced in the prior arts to generate cavitating spaces within one or more fluid substance disposed within one or more housings. The vibrator devices may, for example, be driven by one or more piezoelectric drivers to thereby produce one or more shock wave vibratory forces.

The vibrator devices may be further equipped for, for example, any measuring purposes or testing purposes with one or more devices, which are well known to those of ordinary skill in the art, that provide temporal control of the cavitating spaces, that display and record information about the temporal control of the cavitating spaces, and that display recorded information about the temporal control of the cavitating spaces. The vibrator devices may be further equipped with one or more devices, which are well known to those of ordinary skill in the art, that analyze information about the temporal control of the cavitating spaces and that display and record analyzed information about the temporal control of the cavitating spaces.

The vibrator devices may be further equipped for, for example, any measuring purposes or testing purposes with one or more devices, which are well known to those of ordinary skill in the art, that provide spatial control of the cavitating spaces, that display and record information about the spatial control of the cavitating spaces and that display recorded information about the spatial control of the cavitating spaces. The vibrator devices may be further equipped with one or more devices, which are well known to those of ordinary skill in the art, that analyze information about the spatial control of the cavitating spaces and display recorded analyzed information about the spatial control of the cavitating spaces.

The vibrator devices may be further equipped for, for example, any measuring purposes or testing purposes with one or more devices, which are well known to those of ordinary skill in the art, that couple the produced one or more shock wave vibratory forces to one or more bodies, such as test bodies, by any gas interfaces or any liquid interfaces or any solid interfaces.

The vibrator devices may be further equipped for, for example, any measuring purposes or testing purposes with one or more devices, which are well known to those of ordinary skill in the art, for receiving and transducing at any times or any spatial locations one or more vibratory forces, such as shock waves and non-shock waves, that have been coupled to and propagated by any transmission through, any reflection from, and any refraction by one or more bodies or one or more test bodies. The vibrator devices may be further equipped with one or more devices, which are well known to those of ordinary skill in the art, for display and recording of information about received and transduced vibratory forces that have been propagated by any transmission through or any reflection from or any refraction by one or more bodies or one or more test bodies. The vibrator devices may be further equipped with one or more devices, which are well known to those of ordinary skill in the art, for display of recorded information, analysis of information, display of analyzed information, and recording of analyzed information about received and transduced shock wave vibratory forces that have been propagated by any transmission through or any reflection from or any refraction by one or more bodies or one or more test bodies.

Figure 2:
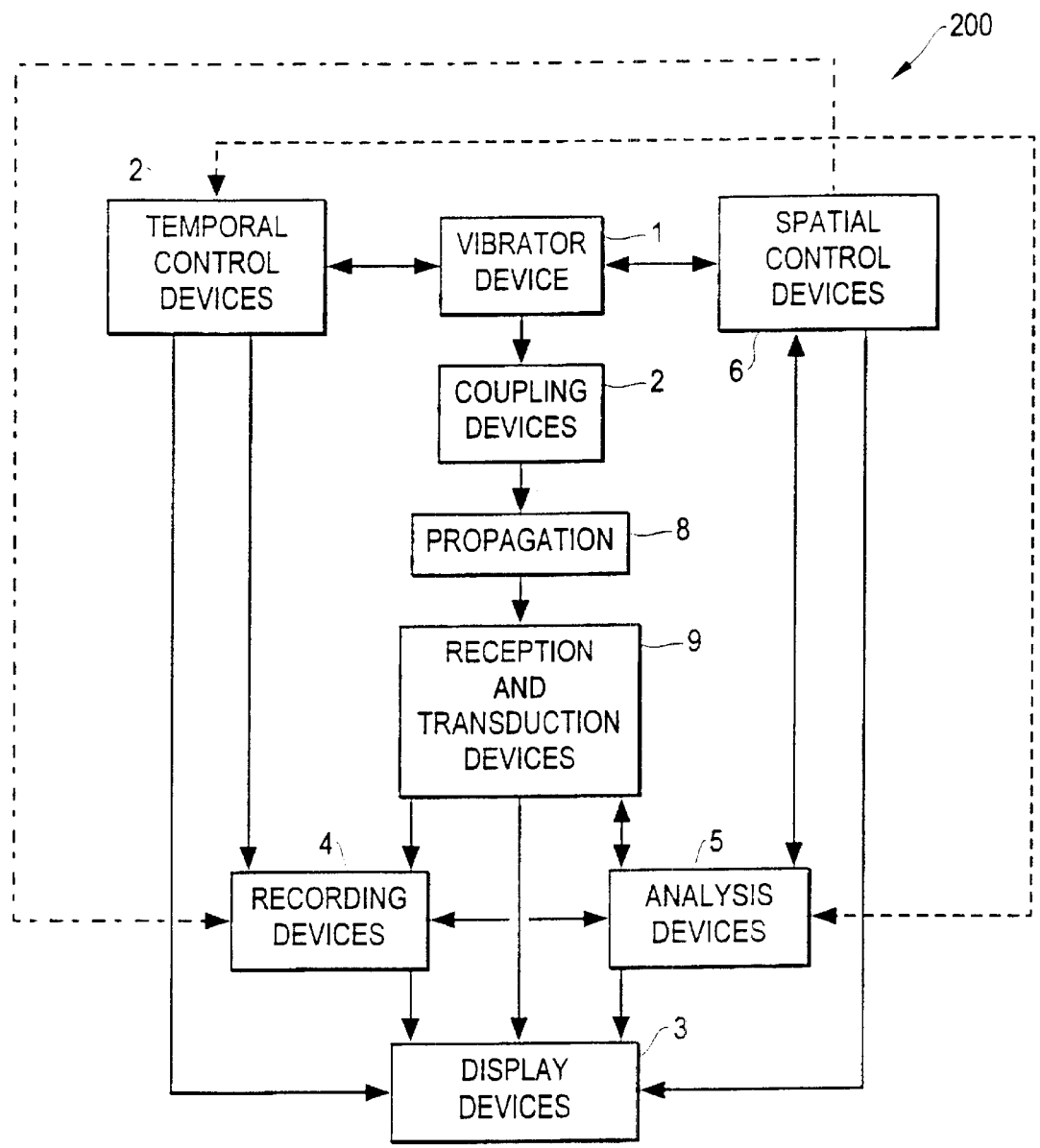
FIG. 2 is a shock wave vibratory system which produces and couples propagating shock wave vibratory forces to a body.

Referring to FIG. 2, the block diagram of shock wave vibratory system 200 illustrates the use of a vibrator device 1 such as vibrator device 101 (FIG. 1) for, for example, any measuring purposes or any testing purposes. The vibrator device 1 is constructed to produce shock waves by, for example, producing one or more cavitating spaces within one or more fluid substances, such as liquid water 104, disposed within a housing of the vibrator device 1. Cavitating spaces within a fluid substance are driven by, for example, one or more piezoelectric drivers. Cavitating spaces collapse at supersonic velocities to produce one or more shock wave vibratory forces.

Figure 3:
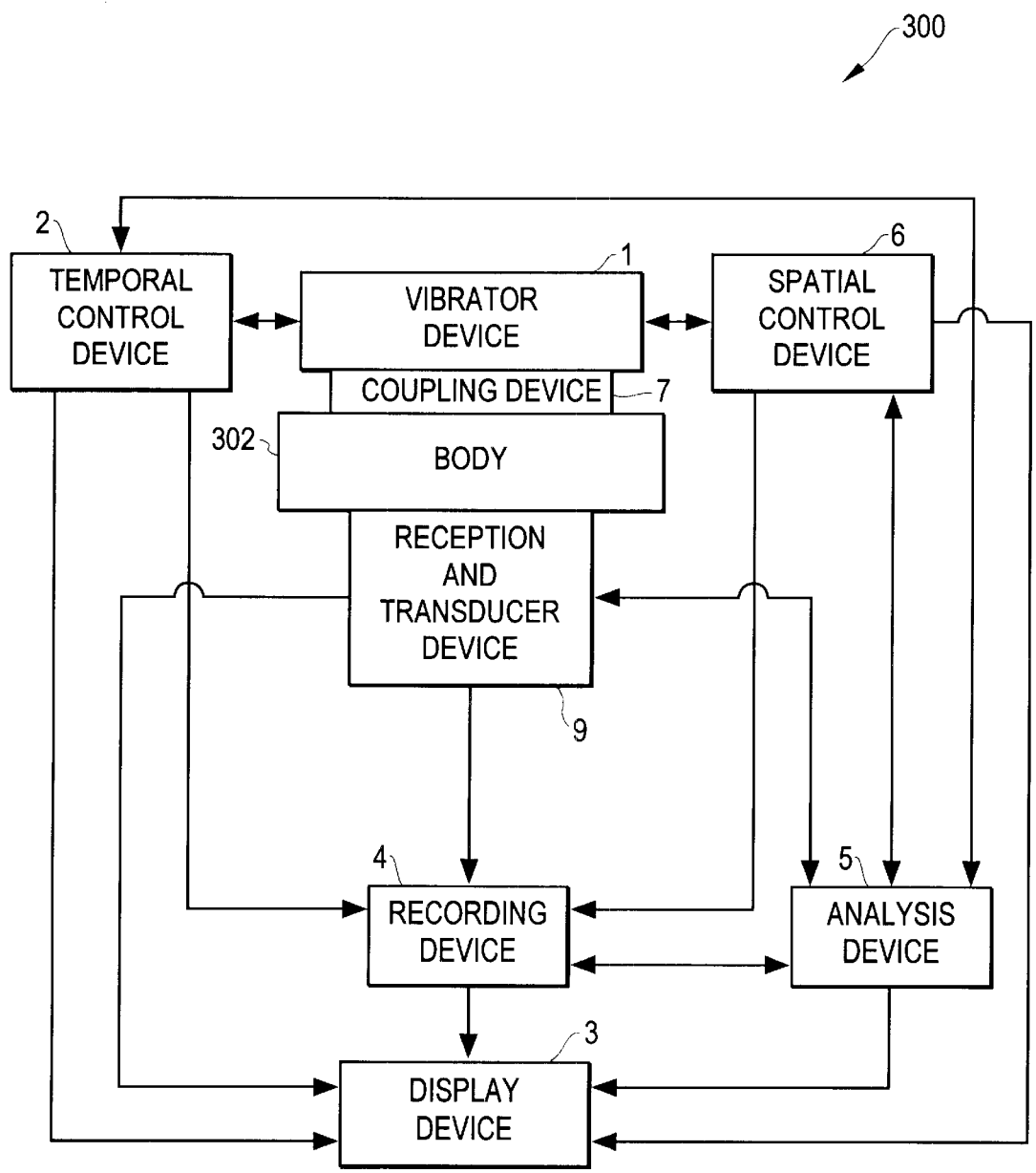
FIG. 3 is an embodiment of the shock wave vibratory system of FIG. 2.

The produced shock wave vibratory forces are controlled by one or more temporal control devices 2, such as the function generator and amplifier 112 (FIG. 3). The temporal control devices 2 communicate information about the temporal control of cavitating spaces to display devices 3, to recording devices 4, and to analysis devices 5. The recording devices 4 communicate with display devices 3. The analysis devices 5 communicate with display devices 3 and recording devices 4.

The produced shock wave vibratory forces are controlled by one or more spatial control devices 6 which communicate information about the spatial control of the cavitating space to display devices 3 and to recording devices 4. Recording devices 4 communicate with display devices 3, and the spatial control devices 6 also communicate information about the spatial control of the cavitating spaces with analysis devices 5. Analysis devices 5 communicate with display devices 3 and recording devices 4.

The produced shock wave vibratory forces are coupled to one or more bodies, such as test bodies, by any gas interfaces, any liquid interfaces, or any solid interfaces 7. The coupled shock wave vibratory forces propagate 8 by any transmission through, any reflection from, and any refraction by one or more bodies or one or more test bodies 8 and are received and transduced by one or more receiving transducer devices 9 at any time or any spatial locations. The shock wave vibratory force receiving transducer devices 9 communicate with display devices 3, recording devices 4, and analysis devices 5. The recording devices 4 communicate with display devices 3, and the analysis devices 5 communicate with display devices 3 and recording devices 4.

Figure 4:
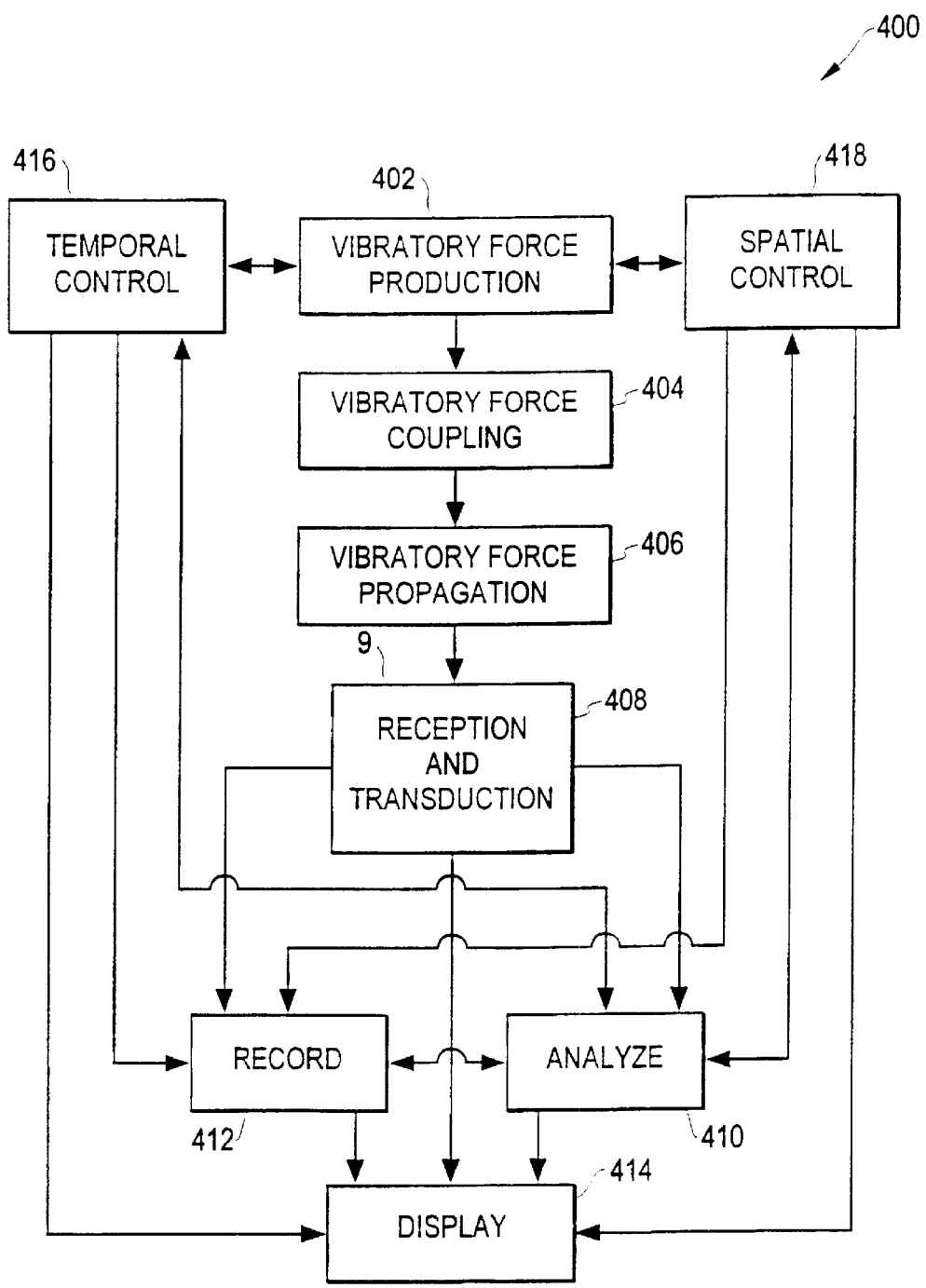
FIG. 4 is a functional block diagram of a method of utilizing vibrator devices which produce shock wave vibratory forces.

Referring to FIGS. 3 and 4, a vibrator device and shock wave force utilization operation 400 utilizes, for example, shock wave vibratory system 300, to produce shock waves to, for example, image, characterize, examine, inspect, or obtain other information about a body 302. Shock wave vibratory system 300, an embodiment of shock wave vibratory system 200, utilizes vibrator device 1 to produce shock wave vibratory forces in vibratory force production operation 402 at a frequency controlled by the temporal control device 2. The temporal control device 2 may cause the vibrator device 1 to repeat production of the shock waves in any pattern including periodic patterns and trains of shock waves. The vibrator device 1 may generate cavitations within a fluid substance which collapse at supersonic velocities to produce the shock wave vibratory forces in vibratory force production operation 402. The shock waves are coupled, in vibratory force coupling operation 404, to body 302 via coupling device 7. Body 302 may be, for example, an organic subject, such as a human or other organic or inorganic body. The coupled shock waves propagate within body 302 in vibratory force propagation operation 406 by any mechanism including reflection, refraction, and approximately unaltered transmission. In reception and transduction operation 408, the transducer and reception device 9 receives propagated vibratory forces and transduces them into electronic signals, such as digital or analog signals. The orientation of coupling device 7 and reception and transducer device 9 with respect to the body and to each other is illustrative and may be varied to couple and detect signals using other spatial orientations. The body 302 may be disposed within the fluid substance within the housing of vibrator device 1, and the coupling device 1 be the fluid substance in the housing which applies the shock wave vibratory force to the body 302. The reception and transducer device 9 may, thus, be disposed in the housing to receive and transduce vibratory force received from the body 302.

In analyze operation 410, the analysis device 5 receives the transduced signals and, for example, extracts and determines information such as imaging information, from the transduced signals. The analyzed information and transduced electronic signals may be recorded by recording device 4 in record operation 412 and displayed by display device 3 in display operation 414.

In temporal control operation 416, temporal control device 2 controls the number of shock waves produced by cavitating spaces in vibrator device 1 within a period of time. When vibrator device 1 is, for example, vibrator device 101 (FIG. 1) which includes piezoelectric drivers 108 and 110 and temporal control device 2 includes function generator and amplifier 112 to drive piezoelectric drivers 108 and 110, the frequency of shock wave generation by a cavitating space is approximately identical to the driving frequency of the piezoelectric drivers 108 and 110. When fluid substance 104 is water with approximately 20% of standard atmospheric gases present, the frequency of shock wave generation may be varied to, for example, approximately 20 to 25 kHz and particularly about 22–23 kHz. 40–50 kHz and particularly about 45 kHz, and 80–90 kHz and particularly about 80–85 kHz. In analyze operation 410, temporal control information from temporal control device 2 may be received and incorporated into the signal analysis of the transduced signals by analysis device 5. Additionally, the temporal control information may be recorded by recording device 4 in record operation 412 and displayed by display device 3 in display operation 414.

Spatial control device 6 controls the physical location of cavitating spaces produced within vibrator device 1 in spatial control operation 418. Spatial control device 6 may, for example, suspend the vibrator device 1 and locate the piezoelectric drivers 108 and 110 in various opposed locations. Spatial control information pertaining to, for example, the location of the cavitating spaces produced within vibrator device 1 may be received and incorporated into the signal analysis of transduced signals by analysis device 5 in analyze operation 410. Additionally, the spatial temporal control information may be recorded by recording device 4 in record operation 412 and displayed by display device 3 in display operation 414.

Figure 5:
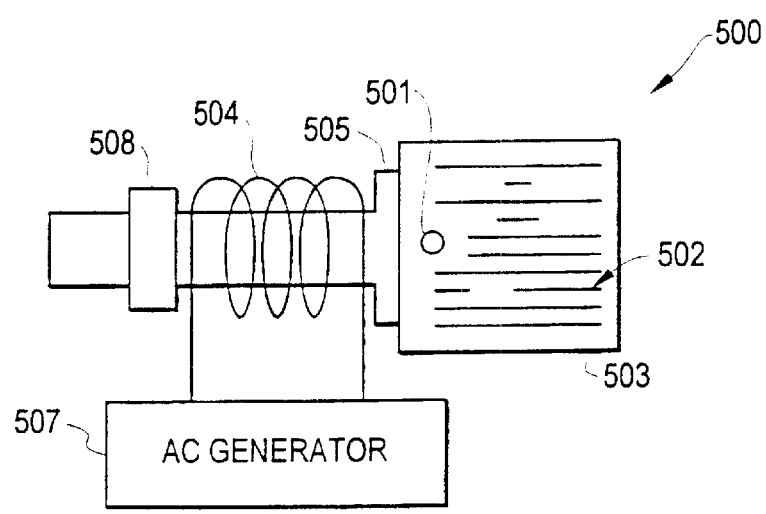
FIG. 5 is an embodiment of a vibrator device in the shock wave vibratory system of FIG. 2 which generates a cavitating space within a fluid substance using electromotive force.

The vibrator device 1 may be any device which creates shock waves within a fluid substance within a housing. Referring to FIG. 5, the vibrator device 1 may in one embodiment be vibrator device 500 which includes a solenoid 504 driven by an alternating current power source 507 which causes piston 505 to alternately exert force on fluid substance 502 and withdraw. Piston 505 may be a magnetostrictive material which deforms when magnetized or may be a conductor that travels within solenoid 504 and bushing 508 in response to the changing solenoid 504 magnetic field. The exertion and withdrawal of force on the fluid substance 502, such as liquid water, confined within housing 503 produces a cavitating space 501. As the cavitating space 501 collapses at supersonic velocity, shock waves are produced and originate in the region of the cavitating space 501. The shock waves may be utilized as described above in conjunction with shock wave vibratory system 200. The frequency of shock wave generation is controlled by an embodiment of temporal control device 2 which controls the motion of piston 505 in a well-known manner.

Figure 6:
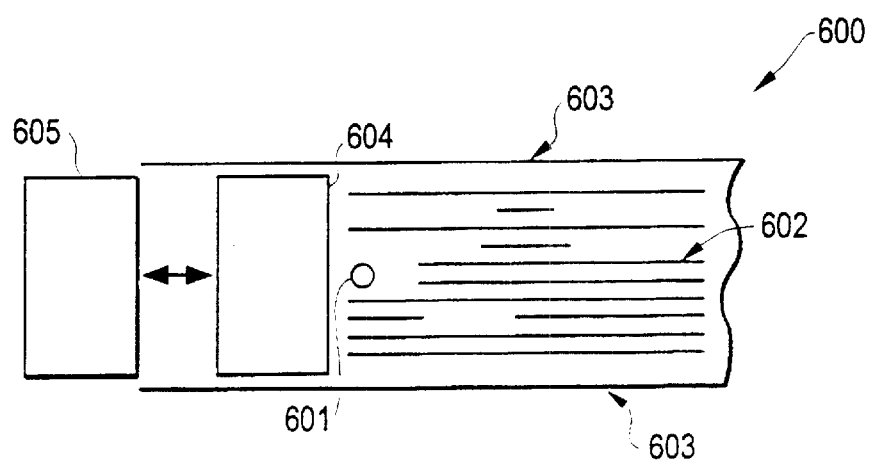
FIG. 6 is an embodiment of a vibrator device which generates a cavitating space within a fluid substance using a mechanically driven piston.

Referring to FIG. 6, the vibrator device 1 may in another embodiment be the vibrator device 600 which includes a mechanically driven piston 604 driven by motor 605 which may, for example, be a pump motor 605. Exertion and withdrawal of force on the fluid substance 602, such as liquid water, confined within housing 603 as piston 604 moves away and toward motor 605, respectively, produces a cavitating space 601. As the cavitating space 601 collapses, shock waves are produced which may be utilized as described above in conjunction with shock wave vibratory system 200. The frequency of shock wave generation is controlled by an embodiment of temporal control device 2 which controls the motion of piston 4 with motor 505 in a well-known manner.

Figure 7:
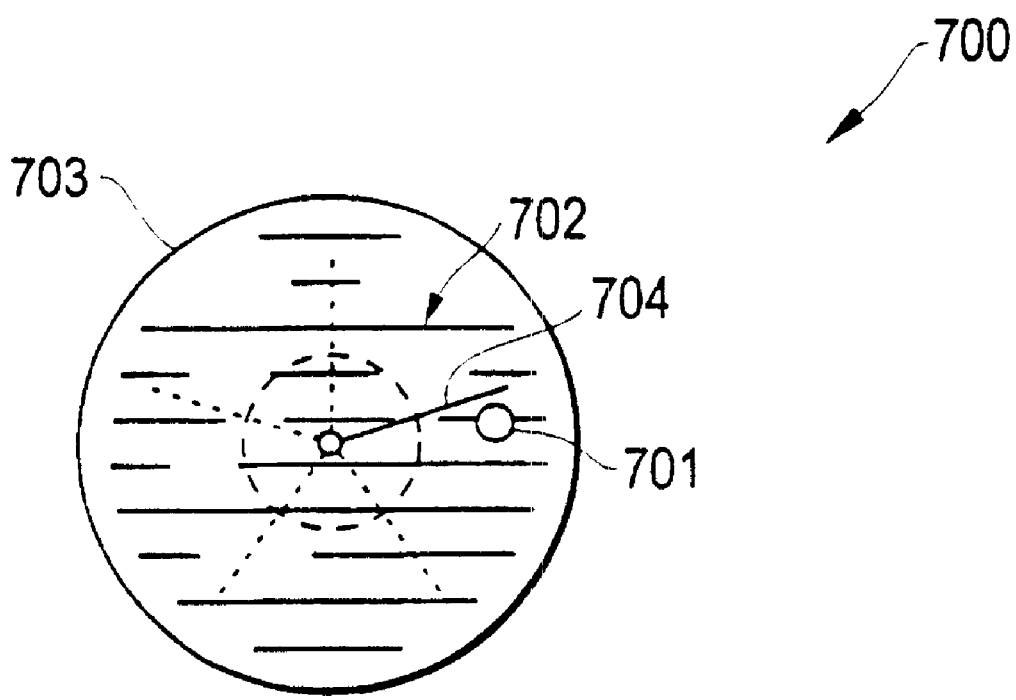
FIG. 7 is an embodiment of a vibrator device which generates a cavitating space within a fluid substance using a centrifugal pump.

Referring to FIG. 7, another embodiment of the vibrator device 1 is vibrator device 700 which includes a centrifugal impeller 104 preferably driven by a motor (not shown). As the impeller 704 rotates within fluid substance 702, such as liquid water, confined within housing 703, cavitating space 701 forms in the region proximate to the impeller driver 704 blades opposite the direction of travel. As the cavitating space 701 collapses, shock waves are produced which may be utilized as described above in conjunction with shock wave vibratory system 200. The frequency of shock wave generation is controlled by an embodiment of temporal control device 2 which controls the rotation speed of impeller 704 in a well-known manner.

Figure 8:
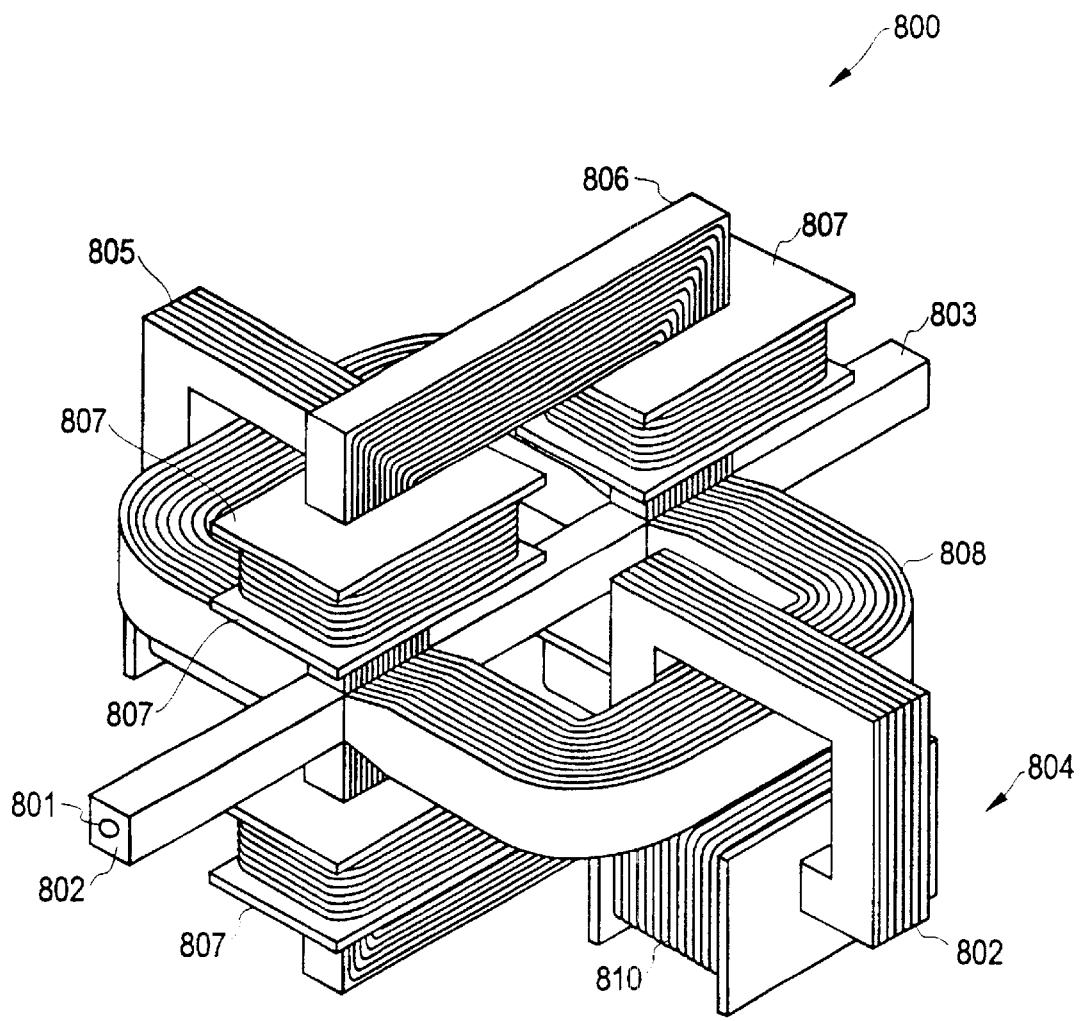
FIG. 8 is an embodiment of a vibrator device which generates a cavitating space within a fluid substance conductor using an electromagnetic induction pump.

Referring to FIG. 8, in another embodiment of vibrator device 1, vibrator device 800 includes an electromagnetic induction pump 804 containing a current transformer 805, magnetic circuit 806, field coils 807, secondary or armature circuit 808, and primary coil 810. The electromagnetic induction pump 804 utilizes alternating current to pump conductive fluid substance 802, such as liquid mercury, sodium, potassium, sodium and potassium alloys, and aluminum, within housing 803 in a well-known manner. As the fluid substance 802 is pumped, cavitating space 801 is produced and collapses to generate shock waves which may be utilized as described above in conjunction with shock wave vibratory system 200. The frequency of shock wave generation is controlled by an embodiment of temporal control device 2 which controls the flow rate of fluid substance 802 in a well-known manner.

Figure 9:
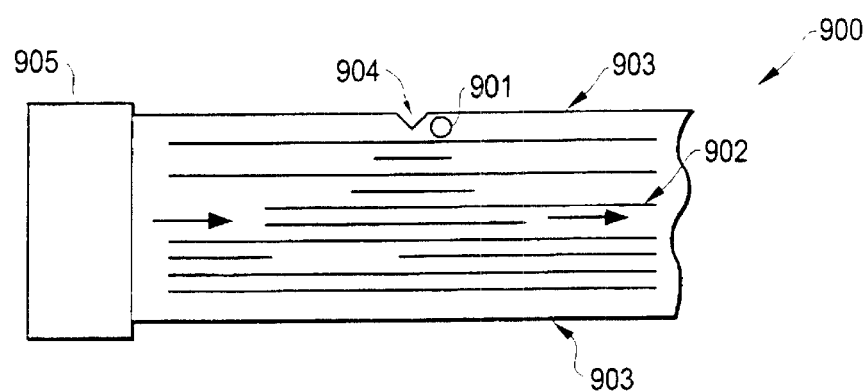
FIG. 9 is an embodiment of a vibrator device which generates a cavitating space within a moving fluid substance using an irregular region.

Referring to FIG. 9, in a further embodiment of vibrator device 1, vibrator device 900 includes a housing 903, which may be metal, that includes an irregularity 904 such as an indentation. As fluid substance 902, such as liquid water, is driven through housing 903 by a pump 905, the irregularity 904 restricts the flow of fluid substance 902, and a cavitating space is formed on the downstream side of irregularity 904. As the cavitating space 901 collapses, shock waves are produced which may be utilized as described above in conjunction with shock wave vibratory system 200. The frequency of shock wave generation is controlled by an embodiment of temporal control device 2 which controls the flow rate of fluid substance 902 and/or the irregularity 904 profile in a well-known manner. Fluid substance 902 is discharged through the distal end of housing 903 and may be recirculated within housing 903.

Figure 10:
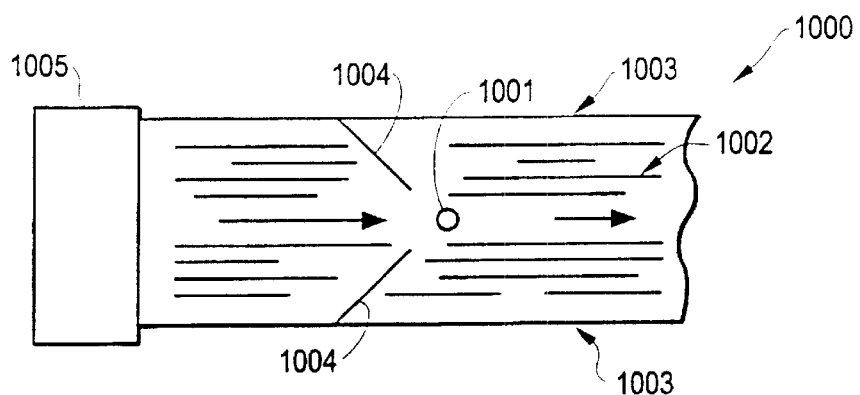
FIG. 10 is an embodiment of a vibrator device which generates a cavitating space within a moving fluid substance jet emitted from a nozzle.

Referring to FIG. 10, in another embodiment of vibrator device 1, vibrator device 1000 includes a nozzle 1004 within housing 1003, which may be metal. The nozzle 1004 may be an integral feature of housing 1003. As fluid substance 1002, such as liquid water, is forced through the nozzle 1004 in a jet stream by pump 1005, cavitating space 1001 is produced at the downstream exit of the nozzle 4. The cavitating space 1001 collapses to generate shock waves which may be utilized as described above in conjunction with shock wave vibratory system 200. The frequency of shock wave generation is controlled by an embodiment of temporal control device 2 which controls the flow rate of fluid substance 1002 and/or the configuration of nozzle 4 in a well-known manner. Fluid substance 1002 is discharged through the distal end of housing 1003 and may be recirculated within housing 1003.

Figure 11:
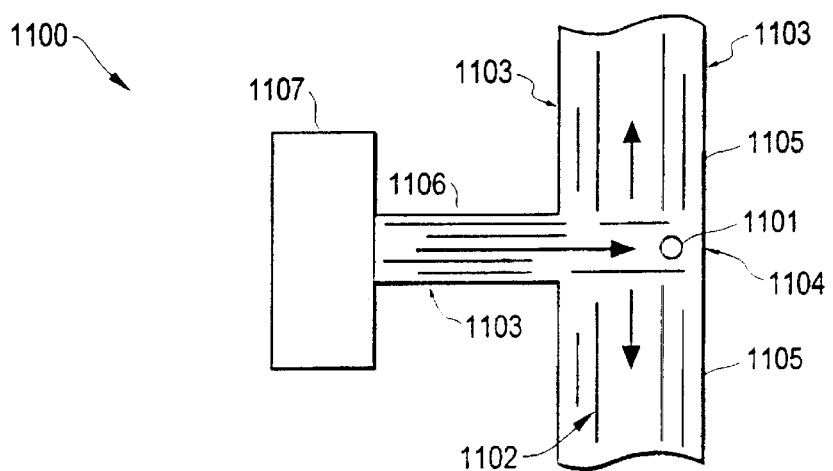
FIG. 11 is an embodiment of a vibrator device which generates a cavitating space within a moving fluid substance after impacting a surface.

Referring to FIG. 11, another embodiment of the vibrator device 1 is vibrator device 1100 which includes a housing 1103. The pump 1107 forces fluid substance 1102, such as liquid water, to impact against an inner surface 1104 of housing 1103 and rebound to produce a cavitating space 1101. After impact, the fluid substance 1102 is diverted to exit channels 1105 which may be of any configuration such as orthogonal to the entrance channel 1106. The cavitating space 1101 collapses to generate shock waves which may be utilized as described above in conjunction with shock wave vibratory system 200. The frequency of shock wave generation is controlled by an embodiment of temporal control device 2 which controls the flow rate of fluid substance 1102 in a well-known manner. Fluid substance 1102 is discharged through the distal ends of housing 1103 and may be recirculated within housing 1103.

Figure 12:
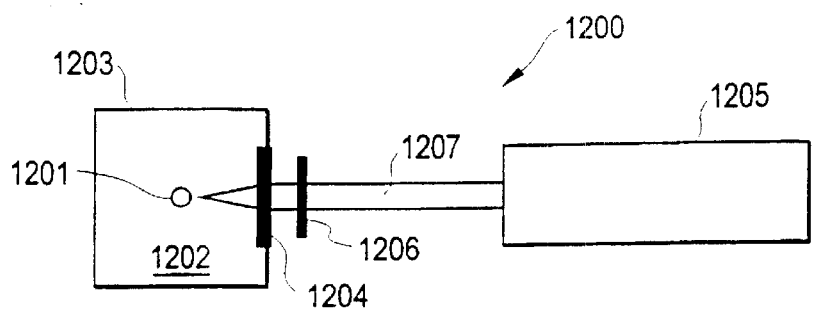
FIG. 12 is an embodiment of a vibrator device which generates a cavitating space within a fluid substance using a laser.

Referring to FIG. 12, another embodiment of the vibrator device 1 is vibrator device 1200 which includes a housing 1203, such as a glass cuvette, having a fluid substance 1202 such as liquid water confined within the housing 1203. An intense laser pulse 1207 from a laser 1205, such as a Q switched Nd:YAG (neodymium:yttrium aluminum garnet), is focused by lenses 1204 and 1206 into the fluid substance 1202. A plasma is thus generated in fluid substance 1202. The production of the plasma produces a cavitating space 1201, and the cavitating space 1201 collapses to generate shock waves which may be utilized as described above in conjunction with shock wave vibratory system 200. The frequency of shock wave generation is controlled by an embodiment of temporal control device 2 which controls the frequency of laser pulses from laser 1205 in a well-known manner. It will be recognized that electromagnetic wave generators may be utilized to produce a cavitating space 1201 within fluid substance 1202.

Figure 13:
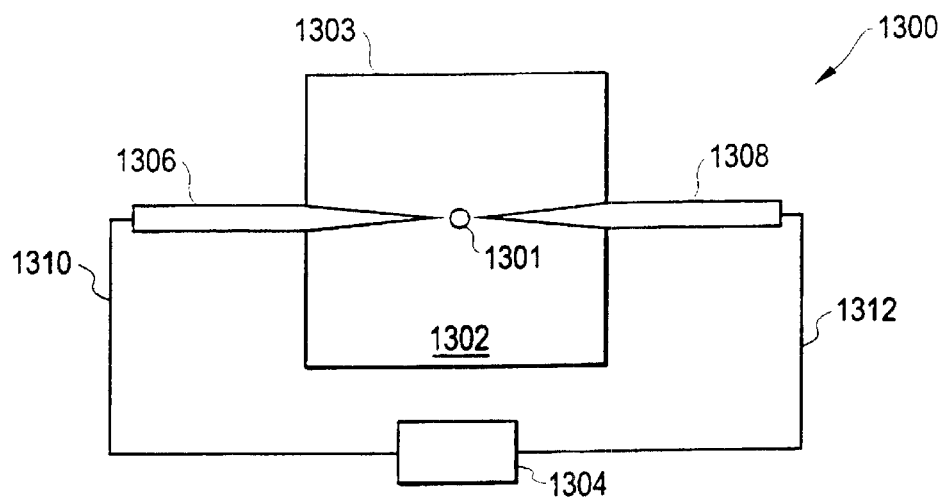
FIG. 13 is an embodiment of a vibrator device which generates a cavitating space within a fluid substance using a spark generated between a pair of electrodes.

Referring to FIG. 13, a further embodiment of the vibrator device 1 is vibrator device 1300 which includes a housing 1303 having a fluid substance 1302, such as liquid water, confined within the housing 1303. Spark generator 1304 is connected to electrodes 1306 and 1308 with conductive cables 1310 and 1312, respectively. The spark generator 1304 generates a potential difference between electrodes 1306 and 1308 sufficient to produce a spark between the electrodes 1306 and 1308. A static spark-generated cavitating space 1301 is thus produced in the proximity of the distal tips of electrodes 1306 and 1308. The cavitating space 1301 collapses to generate shock waves which may be utilized as described above in conjunction with shock wave vibratory system 200. The frequency of shock wave generation is controlled by an embodiment of temporal control device 2 which controls the frequency of sparks produced by spark generator 1304.

Figure 16:
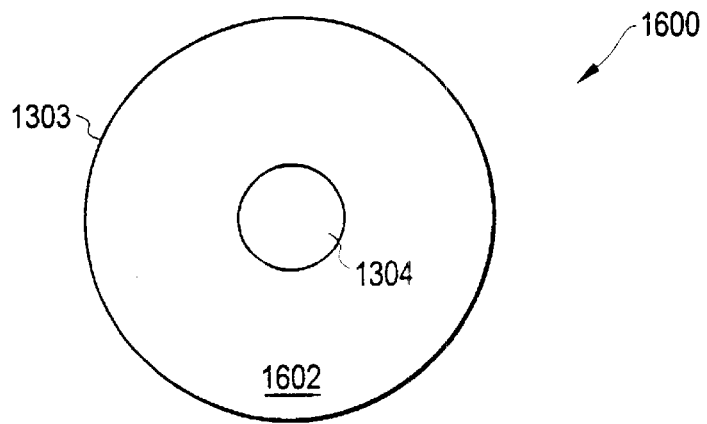
FIG. 16 is an embodiment of the vibrator device which generates a shock wave utilizing an explosive device within a housing.

Shock waves may also be produced and applied to a body in other ways such as by exploding a substance within a housing that will contain the explosion reaction components. Referring to FIG. 16, a further embodiment of the vibrator device 1 is a vibrator device 1600 which includes a housing 1603 having a fluid substance 1602, which may be gas, confined within the housing 1603. An explosive device 1604, which may be detonated by wireless communication or by inserting conductors (not shown) to carry an explosion initiation instruction to the explosive device 1604. After detonation of the explosive device 1604, a shock wave is generated which may be utilized as described above in conjunction with shock wave vibratory system 200.

Figure 14:
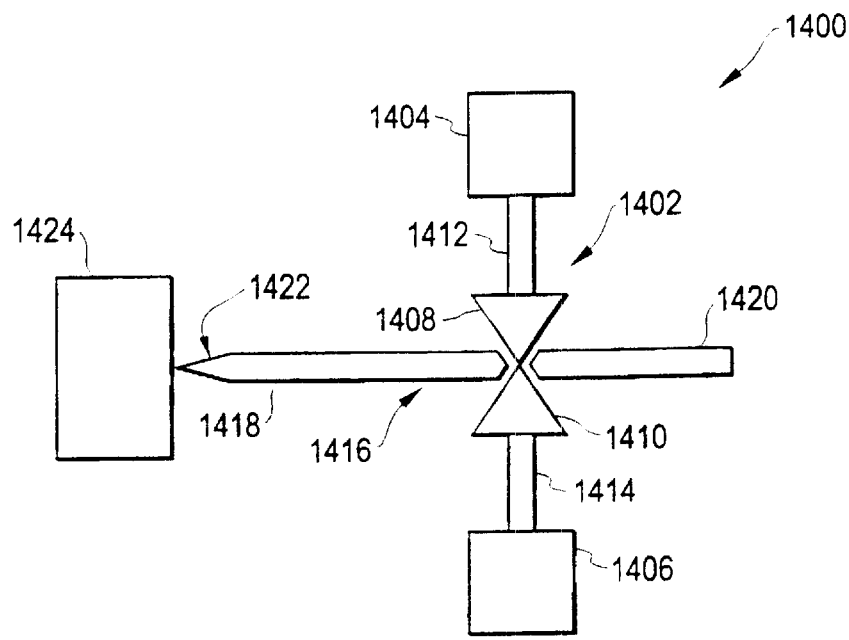
FIG. 14 is an embodiment of a vibrator device including a cutting device to generate a shock wave in a severed object which is transmitted to a body.

Referring to FIG. 14, a further embodiment of the vibrator device 1 is a vibrator device 1400 which includes a cutting device 1402 having drivers 1404 and 1406 to propel opposing blades 1408 and 1410, respectively, toward each other. As drivers 1404 and 1406 exert opposing forces on arms 1412 and 1414, respectively, blades 1408 and 1410 engage cutting shock wave transmitter 1416 which in one embodiment is metal wire such as copper, aluminum, or steel or alloys thereof. As drivers 1404 and 1406 continue to exert the opposing forces, blades 1408 and 1410 will sever shock wave transmitter 1416 into first segment 1418 and a second segment 1420. At the separation of the first segment 1418 from the second segment 1420, a shock wave is generated which propagates to the terminus or distal end portion 1422. The distal end portion 1422 may be shaped, for example, in a conical shape, to focus the shock wave onto the body 1424 which is proximate to, and in this embodiment, in contact with the body 1424. The blades 1408 and 1410 may be driven together at high rate of speed. The vibratory forces from the shock wave transmitted to the body 1424 may be applied to the body 1424 and utilized as described above in conjunction with shock wave vibratory system 200. Other geometrical configurations of blades 1408 and 1410 may be utilized, for example, blades 1408 and 1410 may replace the angled cutting surface in contact with the second segment 1420 with a straight surface. Additionally, the shock wave transmitter 1416 may have any cross-sectional geometry such as circular.

Figure 15:
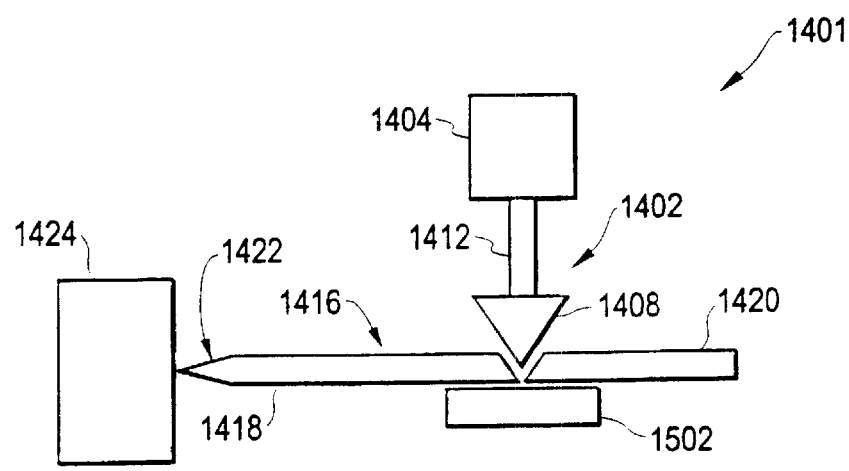
FIG. 15 is another embodiment of the vibrator device of FIG. 14.

Vibrator device 1400 may be modified in numerous embodiments to accomplish severing of shock wave transmitter 1416. For example, as shown in FIG. 15, vibrator device 1400 may be modified to vibrator device 1401 by replacing driver 1406, arm 1414, and blade 1410 with support 1502 to oppose the cutting action of blade 1408 and support shock wave transmitter 1416. Additionally, a feeder mechanism (not shown) may continually feed shock wave transmitters to be successively cut by cutting device 1402 or 1500. Additionally, vibrator device 1400 may include multiple cutting devices 1402 for cutting a shock wave transmitter as described above to generate multiple shock waves simultaneously or in predetermined patterns.

While the invention has been described with respect to the embodiments and variations set forth above, these embodiments and variations are illustrative and the invention is not to be considered limited in scope to these embodiments and variations. For example, the geometries of housings may be altered to accommodate, for example, different bodies to be analyzed, different operating environments, and optimization of shock wave production and propagation. Accordingly, various other embodiments and modifications and improvements not described herein may be within the spirit ad scope of the present invention, as defined by the following claims.

What is claimed is:

1. An apparatus for applying vibratory forces to a body comprising:
   a vibrator device comprising:
   a housing; and
   a fluid substance located within the housing, wherein the vibrator device is capable of producing at least one shock wave within the fluid substance by locally exceeding a tensile strength of the fluid substance to produce a cavitating space and allowing the cavitating space to form, expand, and collapse within the fluid substance; and
   a coupling device disposed between the body and an origination region of the shock wave in the fluid substance to couple vibratory forces from the shock wave to the body.

2. The apparatus as in claim 1 wherein the fluid substance is liquid water.

3. The apparatus as in claim 1 further comprising:
   a temporal controller coupled to the vibrator device to cause the vibrator device to produce shock waves at a predetermined frequency;
   a reception and transducer device to receive the vibratory forces propagated from the coupling device into the body; and
   and an analysis device coupled to the temporal controller and the reception and transducer device to analyze the vibratory forces coupled to the body.

4. The apparatus as in claim 3 further comprising a spatial controller coupled to the vibrator device and analysis device of the vibratory forces.

5. The apparatus as in claim 4 further comprising:
   a display device coupled to the temporal controller, reception and transducer device, and analysis device; and
   a recording device coupled to the temporal controller, reception and transducer device, and analysis device.

6. An apparatus for applying vibratory forces to a body comprising:
   a fluid substance disposed within a housing;
   a vibrator device to produce shock waves from at least one cavitating space by locally exceeding a tensile strength of the fluid substance to produce the at least one cavitating space within the fluid substance;
   a coupling device to couple vibratory forces generated by the cavitating space to the body;
   a reception and transducer device to receive and transduce sound waves produced by the vibratory forces propagating through the body; and
   a temporal control device coupled to the vibrator device to control a frequency of production of the shock waves.

7. The apparatus as in claim 6 wherein the reception and transducer device is capable of producing signals having information contained in the received vibratory forces, the apparatus further comprising an analysis device coupled to the temporal control device and the reception and transducer device to analyze the information in the signals produced by the reception and transducer device.

8. The apparatus as in claim 7 further comprising a spatial control device coupled to the vibrator device and the analysis device to spatially control the cavitating space.

9. The apparatus as in claim 8 further comprising:
   a display device coupled to the analysis device, the spatial control device, the reception and transducer device, and the temporal control device; and a recording device coupled to the analysis device, the spatial control device, the reception and transducer device, and the temporal control device.

10. A method of applying vibratory forces to a body to obtain information about the body comprising the steps of:
producing a cavitating space in a fluid substance within a housing of a vibrator device by locally exceeding a tensile strength of the fluid substance;
allowing the cavitating space to collapse within the fluid substance to produce a shock wave;
applying vibratory force from the shock wave to the body to obtain information about the body.

11. The method as in claim 10 further comprising the steps of:
receiving vibratory force information resulting from application of the vibratory force to the body;
transducing the received vibratory force information; and
analyzing the transduced vibratory force information.

12. The method as in claim 11 further comprising the steps of:
displaying the analyzed vibratory force information; and
recording the analyzed vibratory force information.

13. The method as in claim 10 further comprising the steps of:
detecting vibratory force from the body to obtain the information about the body.

14. The method as in claim 10 further comprising the step of:
repeating the producing and applying steps in a predetermined pattern.

15. The method as in claim 10 wherein the step of applying the vibratory force further comprises applying the vibratory force from the shock wave to the body through a coupling device.

16. The method as in claim 10 further comprising the step of:
temporally controlling the producing and applying steps at a predetermined rate.

17. The claim 1, 6, or 10 wherein the vibrator device includes piezoelectric drivers coupled to the housing to produce the cavitating space within the fluid substance.

18. The claim according to claim 1, 6, or 10 wherein the vibrator device includes a solenoid coupled to a piston to exert force within the fluid substance to produce the cavitating space within the fluid substance.

19. The claim according to claim 1, 6, or 10 wherein the vibrator device includes a motor coupled to a piston to exert force within the fluid substance to produce the cavitating space within the fluid substance.

20. The claim according to claim 1, 6, or 10 wherein the vibrator device includes a motor coupled to an impeller to exert force within the fluid substance to produce the cavitating space within the fluid substance.

21. The claim according to claim 1, 6, or 10 wherein the vibrator device includes an electromagnetic induction pump to exert force within the fluid substance to produce the cavitating space within the fluid substance.

22. The apparatus as in claim 21 wherein the fluid substance is a liquid metal selected from the group comprising aluminum, sodium, potassium, sodium and potassium alloys, and mercury.

23. The claim according to claim 1, 6, or 10 wherein the housing includes an irregularity in an inner surface, and the vibrator device further includes a pump to cause the fluid substance to flow past the irregularity to produce the cavitating space.

24. The claim according to claim 1, 6, or 10 wherein the housing includes a nozzle, and the vibrator device further includes a pump to cause the fluid substance to flow through the nozzle to produce the cavitating space.

25. The claim according to claim 1, 6, or 10 wherein the vibrator device further includes a pump to cause the fluid substance to impact an inner surface of the housing to produce the cavitating space.

* * * * *